(12) United States Patent
Fronius

(10) Patent No.: US 9,981,319 B2
(45) Date of Patent: May 29, 2018

(54) TOOL CLAMPING SYSTEM

(71) Applicant: BILZ WERKZEUGFABRIK GMBH & CO. KG, Ostfildern (DE)

(72) Inventor: Juergen Fronius, Walheim (DE)

(73) Assignee: BILZ WERKZEUGFABRIK GMBH & CO. KG, Ostfildern (DE)

( * ) Notice: Subject to any disclaimer, the term of this patent is extended or adjusted under 35 U.S.C. 154(b) by 109 days.

(21) Appl. No.: 14/958,133

(22) Filed: Dec. 3, 2015

(65) Prior Publication Data

US 2016/0082521 A1    Mar. 24, 2016

Related U.S. Application Data

(63) Continuation of application No. PCT/EP2014/058060, filed on Apr. 22, 2014.

(30) Foreign Application Priority Data

Jun. 6, 2013    (DE) .......................... 10 2013 105 829

(51) Int. Cl.
*B23B 31/02*    (2006.01)
*B23Q 1/00*    (2006.01)
(Continued)

(52) U.S. Cl.
CPC ............ *B23B 31/02* (2013.01); *B23B 31/005* (2013.01); *B23B 51/00* (2013.01); *B23Q 1/0009* (2013.01);
(Continued)

(58) Field of Classification Search
CPC ............... B23B 31/02; B23B 2250/16; B23B 2260/108; B23Q 1/0009; B23Q 5/043
See application file for complete search history.

(56) References Cited

U.S. PATENT DOCUMENTS 4,890,306 A    12/1989 Noda
5,637,973 A *   6/1997 Hirai ..................... B23Q 1/00
                                                         318/16
(Continued)

FOREIGN PATENT DOCUMENTS

DE    199 25 193 A1    10/2000
DE    100 59 193 C1     5/2002
(Continued)

OTHER PUBLICATIONS

German language International Search Report for PCT/EP2014/058060; dated Jul. 7, 2014; 6 pp.
(Continued)

*Primary Examiner* — Eric A Gates
(74) *Attorney, Agent, or Firm* — Harness, Dickey & Pierce, P.L.C.

(57) ABSTRACT

The invention discloses a tool clamping system comprising a tool holder for clamping a tool, said tool holder being configured for being driven rotatingly; a tool secured to the tool holder; a tool shaft carried by the tool; at least one cutting edge carried by the tool; at least one piezo element for generating a voltage from mechanical vibration energy of the rotating tool clamping system; and at least one delay element selected form the group consisting of an inductor and a capacitor being connected to the at least one piezo element so as to form an electrical oscillating circuit, wherein the oscillating circuit is configured for monitoring at least one operating parameter of the tool clamping system.

16 Claims, 3 Drawing Sheets

(51) Int. Cl.
   *B23Q 5/04* (2006.01)
   *B23B 31/00* (2006.01)
   *B23B 51/00* (2006.01)

(52) U.S. Cl.
   CPC .......... *B23Q 5/043* (2013.01); *B23B 2250/16* (2013.01); *B23B 2260/108* (2013.01); *B23B 2260/128* (2013.01); *B23B 2270/022* (2013.01)

(56) References Cited

U.S. PATENT DOCUMENTS

| | | | | |
|---|---|---|---|---|
| 6,586,862 | B1* | 7/2003 | Cselle | B23B 29/03432 |
| | | | | 310/328 |
| 7,647,853 | B2* | 1/2010 | Lundblad | B23B 27/002 |
| | | | | 408/143 |
| 7,908,947 | B2* | 3/2011 | Saeterbo | B23B 31/005 |
| | | | | 408/143 |
| 8,870,500 | B2* | 10/2014 | Short | B23B 29/125 |
| | | | | 408/17 |
| 9,184,803 | B2* | 11/2015 | Graf | B23Q 1/0009 |
| 9,669,471 | B2* | 6/2017 | Short | B23B 37/00 |
| 2009/0234490 | A1 | 9/2009 | Suprock et al. | |
| 2010/0186560 | A1* | 7/2010 | Tzschentke | B23B 29/12 |
| | | | | 82/1.11 |
| 2010/0262308 | A1 | 10/2010 | Anderson et al. | |

FOREIGN PATENT DOCUMENTS

| | | |
|---|---|---|
| DE | 10 2007 005 221 A1 | 8/2007 |
| DE | 601 29 458 T2 | 4/2008 |
| DE | 10 2008 009 340 A1 | 8/2009 |
| DE | 10 2009 027 764 A1 | 1/2011 |
| DE | 10 2009 045 002 A1 | 3/2011 |
| JP | 60-108255 | 6/1985 |
| JP | 2010240745 A * | 10/2010 .......... B32B 31/202 |

OTHER PUBLICATIONS

German language Written Opinion for PCT/EP2014/058060; dated Jul. 7, 2014; 5 pp.

* cited by examiner

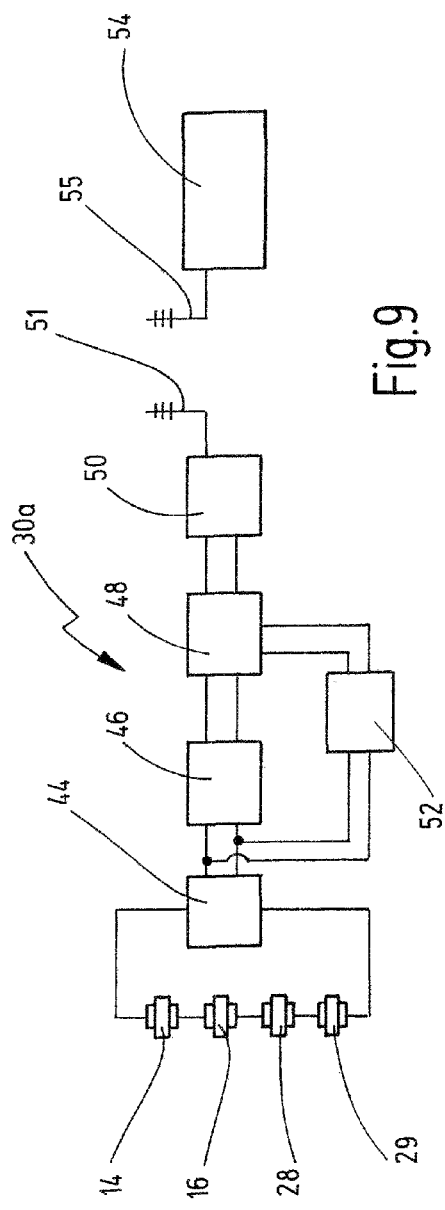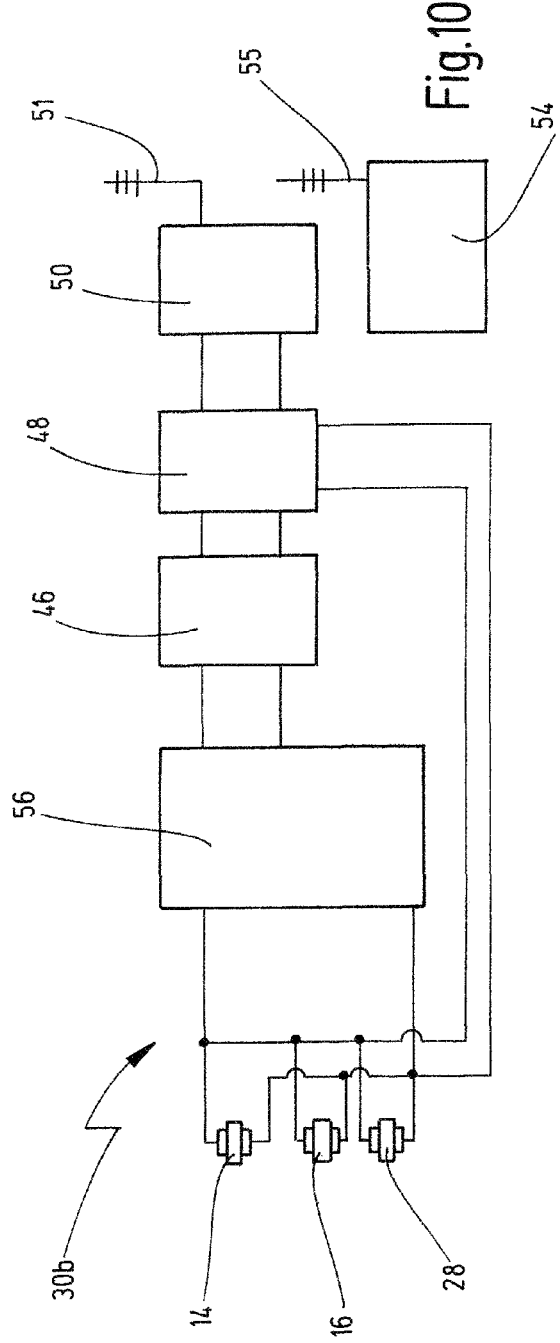

TOOL CLAMPING SYSTEM

CROSS-REFERENCES TO RELATED APPLICATIONS

This application is a continuation of international patent application PCT/EP2014/058060, filed on Apr. 22, 2014 designating the U.S., which international patent application has been published in German language and claims priority from German patent application 10 2013 105 829.9, filed on Jun. 6, 2013. The entire contents of these applications are incorporated herein by reference.

BACKGROUND OF THE INVENTION

The invention relates to a tool clamping system having a rotationally drivable tool holder for clamping a tool.

Tool clamping systems of this type have been known for decades and are used in many ways when machining workpieces.

For some years, it has been required in some machining centers with rotating tools, in addition to the conventional cutting tools, to also provide for measurement-based applications or monitoring operations of the tool. These are generally applications in which a measurement system, usually based on electromechanical principles, is mounted on a spindle interface. On the one hand the connection and guidance is to be ensured by the machine kinematics, and on the other hand the sensing of the measured values and transfer thereof to the controller are to be made possible. Here, the energy supply of the measurement system must be provided usually by batteries or accumulators. The data transfer to a fixed evaluation station takes place as standard via infrared transmitters and receivers, and increasingly also via radio.

However, the supply by means of battery or accumulator is usually a limiting variable, since the assurance of the energy supply thus leads to additional maintenance and supervision effort. The existing contactless inductive energy transfer devices, which primarily enable an energy supply without galvanic contacts or battery, result in considerable interference with the structure of the rotating elements. The charging station is normally located outside the machine tool, or the application in question must be removed from the machine tool in order to change the battery. In addition, the energy supply in the case of sensor systems or possibly also actively operating, actuator systems generally constitutes a limitation. As a result, and due to the extremely harsh environment in the working area of machine tools, the equipping of tools known per se with additional intelligence is not successful in principle.

In view of this there is a need for tool monitoring systems that can operate with machine tools without external energy supply.

SUMMARY OF THE INVENTION

It is a first object of the invention to disclose a tool clamping system having a rotationally drivable tool holder for clamping a tool, which system allows an energy supply for generating electrical energy without an external voltage supply in the form of a battery or an accumulator.

It is a second object of the invention to disclose a tool clamping system allowing for an improved monitoring of operating parameters of the tool clamping system.

It is a third object of the invention to disclose a tool clamping system allowing for a wireless transfer of sensor signals form the tool to a monitoring device.

According to one aspect of the invention a tool clamping system is disclosed comprising:

- a tool holder for clamping a tool, said tool holder being configured for being driven rotatingly;
- a tool secured to said tool holder;
- a tool shaft carried by said tool;
- at least one cutting edge carried by said tool; and
- at least one piezo element for generating a voltage from mechanical vibration energy of said rotating tool clamping system.

In accordance with the invention the mechanical or thermal energy provided in any case with the tool clamping system is specifically used to generate electrical energy therefrom. Here, this may be mechanical energy in the form of different embodiments, for example in the form of vibration energy of the rotating tool clamping system. On the other hand, the thermal energy can be used that is produced in particular by the heating of the tool in the region of the cutting edge(s).

Is an advantageous development of the invention the device has at least one piezo element for generating a voltage from mechanical vibration energy of the rotating tool clamping system.

Since any rotating tool clamping system contains mechanical vibration energy, this can be utilized in a simple manner with the aid of at least one piezo element in order to recover a voltage from the mechanical vibration energy. As a result of the process, vibrations occur during the operation of all cutting tools. The vibrations are largely undesirable, but in part have positive effects on the machining process, such as an improvement of the chip break. Irrespective of this, however, the causes for the mechanical vibrations should not be completely eliminated. Even if it is only a matter of the cutting noise of symmetrical cutting edges in homogenous material, there is still sufficient material in homogeneities to result in a variation of the process forces. In the case of asymmetric tools, such as single-cutting edge short-hole drills, these vibrations are unavoidable. Each cutting entry or exit also causes a cutting force variation, which causes oscillations either in the tool itself or in the tool-spindle combination.

Irrespective of the variation of the mechanical vibration energy, this can be used in accordance with the invention for the generation of a voltage with the aid of at least one piezo element.

Here, the at least one piezo element is arranged in the tool in a region between a cutting edge or a cutting edge support and a shaft of the tool.

Here, the at least one piezo element is preferably designed for the generation of a voltage from mechanical vibration energy of the tool clamping system, in particular in the form of periodically modified torsion of the rotating tool.

Here, the at least one piezo element is expediently integrated in the tool in such a way that a torsion loading of the tool leads to a pressure loading of the at least one piezo element.

As is known, piezo elements are to be loaded substantially by pressure, and therefore must be installed in a suitable form in order to generate a compressive stress at the piezo elements depending on the type of loading that is occurring. In order to be able to use both half-periods of the mechanical vibration for this purpose, a suitable pre-load is to be taken into consideration where necessary during installation of the respective piezo elements. The ability to take up tensile loads is very limited in the case of piezo elements.

In a further advantageous embodiment of the invention a movable interface, in particular in the form of a flexure bearing, is provided on the tool, more specifically between the cutting edge or the cutting edge support and the tool shaft. Here, the at least one piezo element is integrated in such a way that a pressure loading is produced.

In a further embodiment of the invention the at least one piezo element is received in the tool shaft, wherein the piezo element can be introduced into the load flow between the cutting edge and the spindle drive by at least one slot in the tool shaft. It is expedient in principle to accommodate the piezo elements with minimal influence on the basic mechanical properties in the load flow between process forces and drive. Here, it is expedient to use the embodiment of the piezo elements such that the primary direction of action of the piezo element is in the primary direction of vibration, irrespective of whether the pressure generation is generated by torsion, bending or another loading of the mechanical elements.

In this case, with such an installation of the piezo element, a pressure loading can be obtained on account of torsions within the tool shaft and leads to a pulsating output voltage of the piezo element (pulsating DC voltage).

Here, the tool may be designed as a drilling tool, in particular as a short-hole drill, as a milling tool, or as a sawing tool.

In the case of a drilling tool an approximately sinusoidal periodic modification of the output voltage of the piezo element is produced during operation. In the case of a milling or sawing tool, the number of cutting edges used at the same time changes periodically. This leads to a variation of the cutting force varying in a rectangular shape and again to an output signal of the at least one piezo element pulsating in an approximately sinusoidal manner.

In accordance with a further embodiment of the invention the at least one piezo element is connected to at least one inductor and preferably at least one capacitor in such a way that a resonant circuit is produced.

In this way, the periodically modified output voltage of the at least one piezo element can be utilized advantageously in order to enable a wireless transfer (for example with RF assistance) either by means of the resonant circuit or by means of inductive coupling or in another way.

Here, the frequency of the resonant circuit is preferably adapted to the frequency of the primary vibrations of the tool clamping system.

In accordance with a further embodiment of the invention the phase position of the resonant circuit is designed by means of a delay member, for example in the form of a capacitor, in such a way that a phase shift of approximately 180° is produced between the mechanical vibration and the frequency of the resonant circuit.

In this way, a phase shift of approximately 180° is achieved between the force pulsation causing the piezo effect and the feedback, which leads to a mechanical damping effect on the vibration. In this way, the at least one piezo element can be used for mechanical stiffening or for a Tilger effect, whereby the primary mechanical vibration is damped.

Here, for frequency coordination, an adjustable inductor and/or an adjustable capacitor can be used in particular.

In accordance with a further embodiment of the invention a plurality of piezo elements are interconnected in parallel, wherein the arrangement of the piezo elements on the tool is preferably such that there are no phase shifts of the primary vibrations of the tool clamping system at the receiving points of the piezo elements.

Compensation currents between the individual piezo elements are reduced or avoided in this way.

In an alternative embodiment the piezo elements can also be interconnected in series, wherein the arrangement of the piezo elements again on the tool is preferably such that there are no phase shifts of the primary vibrations of the tool clamping system at the receiving points of the piezo elements.

Due to the high voltages occurring here, however, it may be expedient in the case of the series connection if an output voltage of the circuit is reduced by means of a voltage converter to a lower output voltage, preferably of at most approximately 50 V.

Furthermore, multi-layer piezo elements in the form of parallel circuits may be connected in series to other multi-layer elements, which are arranged at different positions of the tool.

This has the advantage of being largely insensitive to force differences and at the same time of enabling a good voltage yield.

In accordance with a further embodiment of the invention the output signal of the at least one piezo element is used as a sensor signal for monitoring an operating parameter of the tool clamping system.

If the target course of the machining process itself is sufficiently well known, the periodically modified output voltage of the piezo element itself can thus be used to monitor the tool clamping system.

This enables a particularly sensitive monitoring of the tool clamping system, since a particularly high sensitivity is produced in this way.

In accordance with a further embodiment of the invention the output signal of the at least one piezo element is fed to a device for voltage conditioning, which feeds a device for generating an RF carrier signal that is coupled to a modulator for modulating an RF carrier signal with a useful signal.

In this way, the useful signal can be directly transferred wirelessly using a circuit of this type.

Here, the output signal of the at least one piezo element itself, i.e. the raw signal, can be used as useful signal in order to hereby enable a process monitoring having minimal loss.

In an alternative embodiment of the invention a sensor device may also be received in the tool, which sensor device is fed by the device for voltage conditioning and of which the output signal is fed preferably to the modulator as useful signal.

If the voltage yield is sufficiently high, different sensors for process monitoring can thus be integrated directly into the tool.

In an expedient development of the previously described embodiments, the modulator is preferably coupled to a transmitting device for the wireless transfer of the modulated RF carrier signal to a stationary evaluation unit.

The RF signal is then received in the stationary evaluation unit by means of a suitable antenna and can be used by means of a filter and further components known in principle in RF technology to extract the useful signal and further process this in a suitable manner.

In accordance with a further embodiment of the invention an output voltage of the connected piezo elements is fed to a device for voltage conditioning, which preferably has at least one capacitor and preferably a device for voltage stabilization, for example in the form of a Zener diode.

In this way, a desired consumer can be supplied with a smoothed or stabilized voltage.

Here, the sensor device may be a sensor device that is used to monitor an operating parameter of the tool clamping system.

It is conceivable to monitor any operating parameters, which include in particular the temperature of the tool, the temperature of the coolant, the torsion of the tool, the cutting force, the acceleration of the tool, and the cutting integrity.

In accordance with a further embodiment of the invention the sensor device is integrated in the tool and is coupled to a device for the wireless transfer of a signal to a stationary evaluation circuit.

For this purpose the tool may be coupled to the tool holder via an electric interface for the transfer of an electric signal. The device for wireless transfer of a signal may then be provided preferably in the tool holder for space reasons.

In principle, it may be recommended, also for space reasons, to provide merely the at least one piezo element and where necessary also the device for voltage conditioning (such as the capacitor and where necessary voltage stabilizer) in the region of the tool, whereas all further components are provided in the region of the tool holder.

In accordance with a further embodiment of the invention the output signal of the at least one piezo element is fed back to a controller of the drive machine as control variable.

The fed-back signal can be used advantageously for process adaptation.

It goes without saying that the features mentioned above and the features yet to be explained hereinafter can be used not only in the specified combinations, but also in other combinations or independently, without departing from the scope of the invention.

BRIEF DESCRIPTION OF THE DRAWINGS

Further features and advantages of the invention will emerge from the following description of preferred exemplary embodiments with reference to the drawing, in which:

FIG. 9 shows a modified embodiment with a series connection of piezo elements and with an RF generator with a modulator and a transmitter and a separate sensor, of which the output voltage is modulated to the RF carrier signal;

FIG. 10 shows a further embodiment of a circuit according to the invention, in which the piezo elements are interconnected in parallel and are fed to a device for voltage conditioning, by which an RF generator and a modulator are fed, wherein the primary output signal of the piezo sensors is fed to the modulator as useful signal, which is modulated to the RF carrier signal and lastly is transferred via a transmitter to a stationary evaluation circuit.

DESCRIPTION OF PREFERRED EMBODIMENTS

Figure 1:
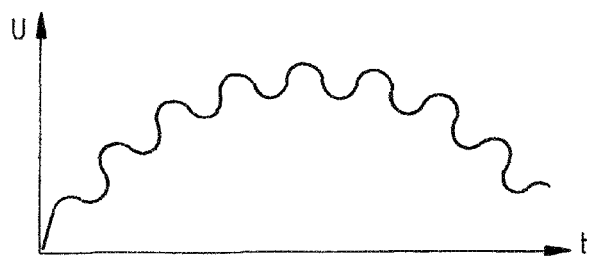
FIG. 1 shows a schematic illustration of the output voltage of a piezo element over time when starting the rotating tool clamping system in the case of a drilling tool.

In FIG. 1 the output voltage of a piezo element, which is installed in the shaft region of a short-hole drill, is illustrated schematically, more specifically during the start-up of the drill, i.e. in a state that is not yet established or stable.

Proceeding from the rest state, an initially slowly rising output signal that is periodically modified in an approximately sinusoidal shape can be seen, which then falls again over the course of time.

Figure 2:
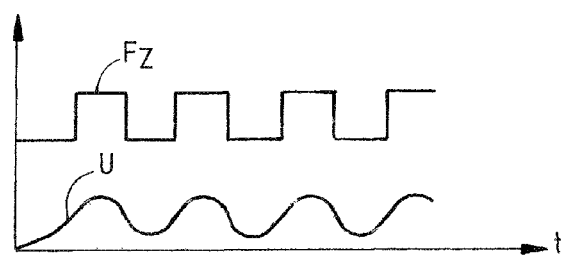
FIG. 2 shows a fundamental load moment and an output voltage of a piezo element over time in an established process in the form of a milling or sawing tool.
Figure 3:
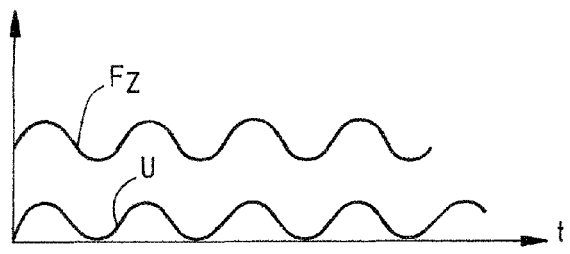
FIG. 3 shows a fundamental load moment and an output voltage over time in an established process in the case of a drilling tool.

The cutting force moments and the associated output signals of a piezo element in a milling tool or a drilling tool are illustrated schematically in FIGS. 2 and 3, wherein the piezo element is installed on the shaft of the tool in such a way that a torsion loading of the tool leads to a pressure loading of the piezo element.

In the case of a milling tool (or sawing tool) the periodically modifying number of cutting edges currently engaged leads to an approximately square-wave signal. The piezo element accordingly delivers a DC voltage pulsating approximately in a sinusoidal manner.

In the case of a drill, an approximately sinusoidal cutting force variation is produced in accordance with FIG. 3 in the established state and leads again at the piezo element to a DC voltage pulsating approximately in a sinusoidal manner.

Piezo elements can thus be used in principle in order to utilize the voltage pulsations occurring in a rotating cutting tool in order to enable an independent voltage supply in the region of the tool on the one hand and in order to enable a process monitoring on the other hand, whether by direct use of the generated voltage signal or whether by a sensor, which is fed with utilization of the piezo voltage.

Figure 4:
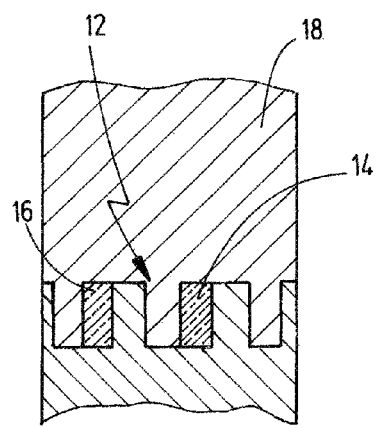
FIG. 4 shows a schematic illustration of a mechanical interface on the shaft of a drilling or milling tool.

In FIG. 4 it is schematically illustrated how piezo sensors can be integrated into the shaft 19 of a tool 10. The tool shaft 19 is interrupted by a mechanical interface 12, primarily in the form of a flexure bearing, wherein the piezo elements 14, 16 are incorporated in such a way that the torsion starting from the driven tool head 18 is transferred via the flexure bearing 12 to the piezo elements 14, 16, which here are loaded by pressure and are driven via the tool head 18.

Figure 5:
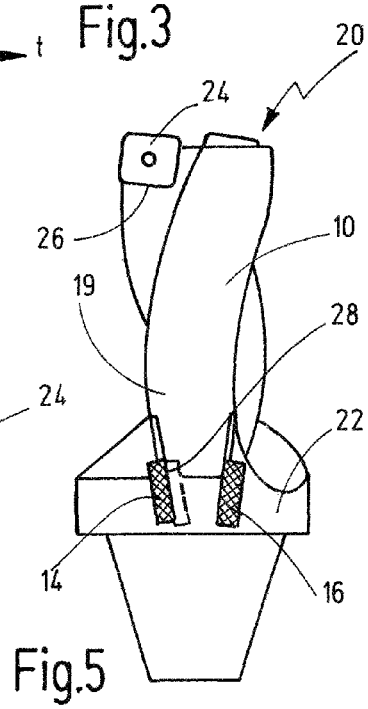
FIG. 5 shows a side view of a short-hole drill drilling tool with schematically illustrated installation positions for piezo elements.

In FIG. 5 a view of a tool clamping system according to the invention is illustrated in a simplified manner and is designated on the whole by the number 20. Here, the tool 10 is embodied as a short-hole drill and is clamped in a tool holder (HSK) 22.

The tool 10 has two cutting edges 24, which are screwed at the upper end of the tool 10 to cutting edge supports 26.

The piezo elements are arranged in the region of the end of the shaft 19 facing toward the tool holder 22, as indicated schematically by the piezo elements 14, 16, 28 (merely two piezo elements 14, 16 can be seen in the illustration according to FIG. 5, and a third piezo element 28 is indicated in a dashed manner). In accordance with FIG. 6, slots 17 are formed between the driving part of the tool shaft 19 and the force-absorbing part of the tool shaft 19, in which the piezo elements 14, 16, 28 and 29 (see the plan view according to FIG. 6) are arranged, in order to convert a certain torsion into a pressure loading of the piezo elements 14, 16, 28, 29 starting from the driving part of the tool shaft 19.

Figure 6:
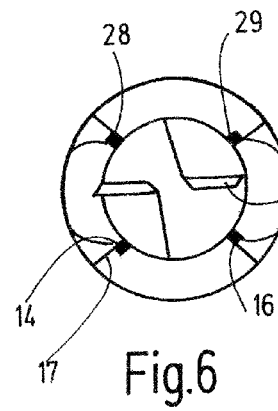
FIG. 6 shows a plan view of the tool according to FIG. 5.

It can be seen from the plan view according to FIG. 6 that the cutting edges 24 of the tool 10 embodied as a short-hole drill are offset to one side asymmetrically from the center axis, as is known in the prior art.

The piezo elements 14, 16, 28, 29 are preferably arranged in such a way that there are no phase shifts of the vibration loads relative to one another, since these would lead to compensation currents between the piezo elements 14, 16, 28, 29.

Figure 7:
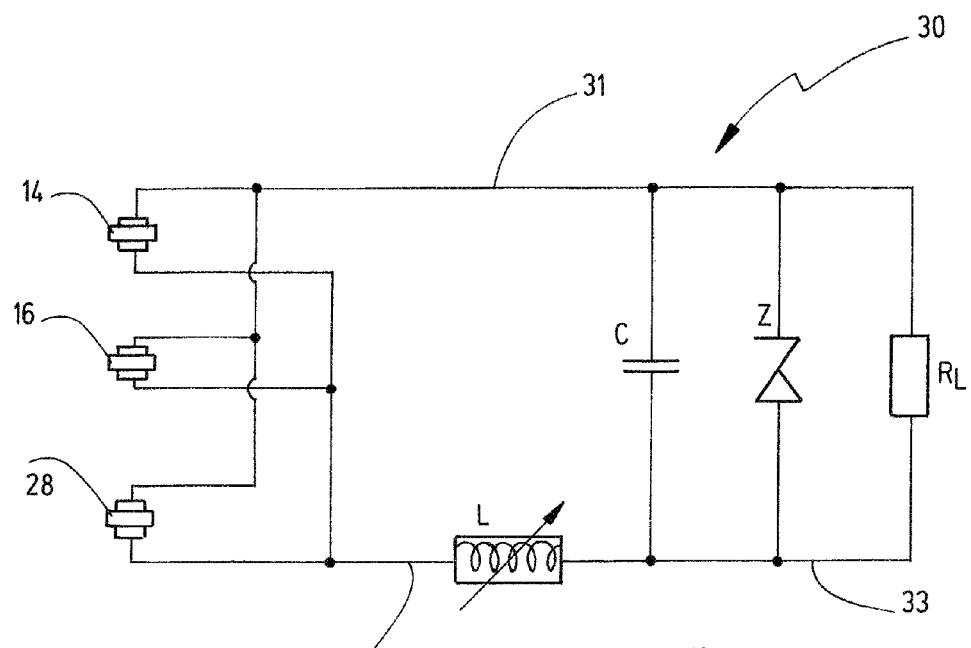
FIG. 7 shows a parallel circuit of three piezo elements, which are connected to an inductor, a capacitor and a Zener diode to form a resonant circuit.

In FIG. 7 a first conceivable connection of a plurality of piezo elements is illustrated, wherein the different piezo elements are connected in parallel and are coupled to form a resonant circuit.

The circuit 30 according to FIG. 7 presents three piezo elements 14, 16, 28, which can be extended by any number and are interconnected in parallel. The output voltage of the piezo elements is connected on the one hand to a capacitor C and a Zener diode Z via a line 31, whereas the other pole of the output voltage is connected via a line 32 to a tunable inductor L, which is coupled to the other pole of the capacitor C and the Zener diode Z.

A tunable resonant circuit to which a load $R_L$ is coupled is thus generated.

A resonant circuit of this type can be adapted preferably with a frequency to the frequency of the primary vibrations of the tool clamping system 20. For this purpose, the adjustable inductor L and/or alternatively an adjustable capacitor C can be used. The resonant circuit can be used in order to inductively or capacitively couple the vibrations to an external resonant circuit in order to thus enable a wireless transfer to the external resonant circuit. The phase position of the resonant circuit may also be adapted by means of the adjustable delay member, i.e. for example the adjustable inductor L or an adjustable capacitor C, in such a way that a phase shift of approximately 180° is produced between the mechanical vibration and the frequency of the resonant circuit.

In this case the resonant circuit counteracts the mechanical vibration and thus leads to a stiffening/damping of the system (Tilger effect).

Instead of a parallel connection of the piezo elements 14, 16, 28 and 29, a series connection of the piezo elements is also possible in principle. However, due to the relatively high output voltage of the piezo elements, voltages are produced here that may reach several hundreds of volts or more depending on the number of piezo elements. In this case it is expedient to reduce the output voltage via a voltage transformer (inverter) and to limit said voltage to a suitable output voltage for example in the order of 50 V.

FIG. 9 shows a circuit 30a of this type by way of example. Here, the output voltage of four piezo elements 14, 16, 28, 29 interconnected in series is firstly reduced via a voltage transformer 44, the output voltage of which is supplied to an RF generator 46, which is coupled to a modulator 48 and a downstream transmitter 50, which emits the RF energy outwardly via an antenna 51. A sensor 52, which is integrated in the region of the tool head 18, is also supplied with the output voltage of the voltage transformer 44. The output signal of the sensor 52 is fed to the modulator 48 in order to modulate the high-frequency carrier signal of the RF generator with the output voltage of the sensor 52.

In an associated stationary evaluation circuit 54, the RF signal is received by means of an antenna 55 and is then processed by means of circuit elements (filters, amplifiers, etc.) as is known in principle in order to extract the useful signal of the sensor 52 again from the RF signal and to amplify this. The circuit 54 may also be integrated in a central machine controller, of which the extracted signal is used in order to adapt the operating process.

Figure 8:
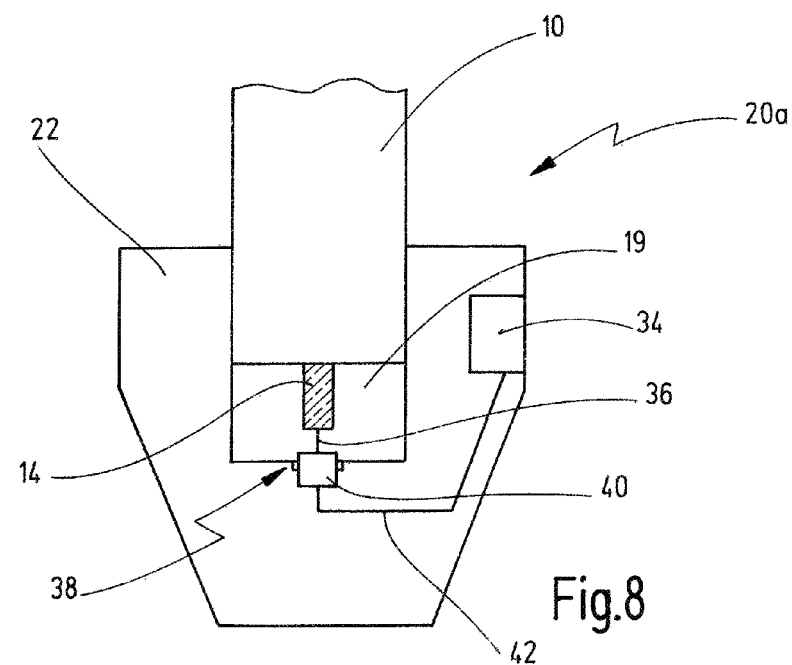
FIG. 8 shows a simplified schematic illustration of an electric interface between the shaft end of a tool and a tool holder.

FIG. 8 shows a schematic illustration of a modified embodiment of a tool clamping system designated on the whole by 20a. Here, the output signal is not transferred from the piezo element 14 wirelessly, but via electrical contact at the end of the tool shaft 19, via a signal line 36 and a schematically indicated electric interface 38 on the tool holder 22 (a cooling channel has been omitted from the illustration for reasons of simplification).

Here, a resilient transfer is preferably used for the purpose of particularly good contact. For insulation, suitable ceramic coatings can be used in the region of the mutually opposed faces. The voltage is transferred via a contact pin 40 via a line 42 connected thereto to an evaluation circuit 34, which is arranged within the tool holder 22. From here, the further data transfer can be implemented preferably wirelessly via radio, RFID or in another way.

FIG. 10 shows a further modification of a circuit according to the invention designated on the whole by 30b.

Here, the piezo elements, of which three piezo elements 14, 16, 28 are illustrated by way of example, are interconnected in parallel and serve firstly for the supply of a voltage conditioning 56. Here, this may be again a capacitor coupled to a Zener diode. The output voltage thus smoothed and stabilized from the voltage conditioning 56 is again fed to a generator 46, which is coupled to a modulator 48, followed by a sensor 50 having an RF antenna 51.

In contrast to the circuit according to FIG. 9, however, no separate sensor is used here, but instead the output signal of the piezo elements 14, 16, 28 is fed directly to the modulator 48, by which it is conditioned and modulated to the RF carrier signal as useful signal. With a suitable arrangement, just one individual piezo signal may also be used for process mapping, or the signals can be transferred separately to a number of differently arranged piezo elements and conclusions regarding the process can be made on the basis of the difference, for example in the amplitude.

This circuit consequently has much lower loss than the circuit described previously on the basis of FIG. 9 and enables a direct transfer of the signal received by the piezo elements 14, 16, 28 as a result of the mechanical vibration energy of the tool clamping system.

If the process of the workpiece machining is sufficiently known, the integrity of the operating process can thus be determined by the monitoring of this signal, i.e. for example a failure or damage to the cutting edges can be identified, since this would lead directly to a modified output signal of the piezo elements 14, 16, 28.

It goes without saying that the previously presented examples are merely a small number of exemplary applications, which are intended to present the possibilities that exist with the utilization of piezo elements for the generation of voltages from the mechanical vibration energy of the tool clamping system.

In principle, there are various possibilities for using the output signal of the piezo elements for voltage supply, for evaluating the signal for the monitoring of the operating process and transferring said signal to a stationary system, and for feeding one or more sensors for the monitoring of the operating process.

Lastly, it goes without saying that, instead of analogue circuit components as described here, digital circuits may of course also be used.

The invention claimed is:

1. A tool clamping system comprising:
    a tool holder for clamping a tool, said tool holder being configured for being driven rotatingly;
    a tool secured to said tool holder;
    a tool shaft carried by said tool;
    at least one piezo element for generating a voltage from mechanical vibration energy of said rotating tool clamping system; and
    at least one electrical delay element selected from the group consisting of an inductor and a capacitor being connected to said at least one piezo element so as to form an electrical oscillating circuit, said oscillating circuit being configured for monitoring at least one operating parameter of said tool clamping system.

2. The tool clamping system of claim 1, wherein said operating parameter of said tool clamping system is selected from the group consisting of a temperature of said tool, a temperature of a coolant, a torsion of said tool, a torque transferred by said tool, an acceleration of said tool, and an integrity of said tool.

3. A tool clamping system comprising:
    a tool holder for clamping a tool, said tool holder being configured for being driven rotatingly;
    a tool secured to said tool holder;
    a tool shaft carried by said tool;
    at least one piezo element for generating a voltage from mechanical vibration energy of said rotating tool clamping system; and
    at least one electrical delay element selected from the group consisting of an inductor and a capacitor being connected to said at least one piezo element so as to form an electrical oscillating circuit.

4. The tool clamping system of claim 3, wherein said electrical oscillating circuit is configured as a resonant circuit.

5. The tool clamping system of claim 4, wherein said resonant circuit has a resonant frequency that is tuned to a frequency of primary vibrations of said tool clamping system.

6. The tool clamping system of claim 4, wherein said resonant circuit is inductively or capacitively coupled to an external resonant circuit.

7. The tool clamping system of claim 4, wherein said resonant circuit comprises a delay member determining an electrical phase position of said resonant circuit, and wherein said tool clamping system during use generates mechanical vibrations having a mechanical phase position, wherein said delay member is adjusted so as to adjust said electrical phase position to be substantially in opposition to said mechanical phase position.

8. The tool clamping system of claim 3, comprising a plurality of piezo elements being interconnected in series or in parallel.

9. The tool clamping system of claim 8, wherein said plurality of piezo elements are received within said tool or said tool holder at certain receiving points, said receiving points of said piezo elements being selected so as to avoid phase shifts of primary mechanical vibrations of said tool clamping system at said receiving points.

10. The tool clamping system of claim 3, wherein said at least one piezo element generates an output signal that is fed to a voltage conditioner, said voltage conditioner feeding an oscillator for generating an RF carrier signal being coupled to a modulator for modulating said RF carrier signal with a useful signal.

11. The tool clamping system of claim 10, wherein said output signal of said at least one piezo element is used as useful signal.

12. The tool clamping system of claim 10, further comprising a sensor received in said tool, said sensor generating an output signal being fed to said modulator as a useful signal.

13. The tool clamping system of claim 12, wherein an output voltage of said piezo elements is fed to a voltage conditioner.

14. The tool clamping system of claim 13, wherein said output voltage of said piezo elements, after conditioning, is fed to a sensor for monitoring an operating parameter of said tool clamping system.

15. A tool clamping system comprising:
    a tool holder for clamping a tool, said tool holder being configured for being driven rotatingly;
    a tool secured to said tool holder;
    a tool shaft carried by said tool;
    at least one piezo element for generating a voltage from mechanical vibration energy of said rotating tool clamping system; and
    at least one electrical delay element selected from the group consisting of an inductor and a capacitor being connected to said at least one piezo element so as to form an electrical oscillating circuit, said oscillating circuit being configured for monitoring at least one operating parameter of said tool clamping system;
    wherein said electrical oscillating circuit is configured as a resonant circuit.

16. The tool camping system of claim 15, wherein said resonant circuit has a resonant frequency that is tuned to a frequency of primary vibrations of said tool clamping system.

* * * * *